United States Patent
Huang

(10) Patent No.: US 10,860,337 B2
(45) Date of Patent: *Dec. 8, 2020

(54) METHOD, DEVICE AND USER TERMINAL FOR LOADING APPLICATION

(71) Applicant: Alibaba Group Holding Limited, Grand Cayman (KY)

(72) Inventor: Yinfeng Huang, Guangzhou (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 168 days.

This patent is subject to a terminal disclaimer.

(21) Appl. No.: 15/919,708

(22) Filed: Mar. 13, 2018

(65) Prior Publication Data

US 2019/0004829 A1    Jan. 3, 2019

(30) Foreign Application Priority Data

Jun. 29, 2017 (CN) .......................... 2017 1 0515088

(51) Int. Cl.
    *G06F 9/46*     (2006.01)
    *G06F 9/445*    (2018.01)

(52) U.S. Cl.
    CPC ...... *G06F 9/44521* (2013.01); *G06F 9/44505* (2013.01); *G06F 9/44573* (2013.01); *G06F 9/44578* (2013.01)

(58) Field of Classification Search
    None
    See application file for complete search history.

(56) References Cited

U.S. PATENT DOCUMENTS

| 7,685,589 B2 * | 3/2010 | Trowbridge ............ G06F 9/445 717/166 |
| 7,685,596 B1 * | 3/2010 | Webb ........................ G06F 8/61 717/177 |

(Continued)

FOREIGN PATENT DOCUMENTS

| CN | 101833464 A | 9/2010 |
| CN | 101980157 A | 2/2011 |

(Continued)

OTHER PUBLICATIONS

Search Report for Chinese Application No. 2017105150884 dated Jan. 7, 2020, 2 pages.

(Continued)

*Primary Examiner* — Van H Nguyen
(74) *Attorney, Agent, or Firm* — Alston & Bird LLP

(57) ABSTRACT

Provided are a method, a device and a user terminal for loading an application, and relates to the field of Internet technology. The method for loading an application is applied to a user terminal, and the method includes: in response to a function enabling instruction, matching independent functional components of a corresponding application program, where the application program is packaged in advance according to the implemented functions to include multiple functional components, and the functional components include an independent functional component; obtaining an executable file corresponding to the independent functional component; and loading the executable file corresponding to the independent functional component. According to the present invention, a corresponding executable file is loaded according to a user's needs, such that the application is loaded in a way more flexible and quicker, the storage space occupied by the application for a long period of time is reduced.

10 Claims, 4 Drawing Sheets

(56) References Cited

U.S. PATENT DOCUMENTS

| | | | |
|---|---|---|---|
| 10,223,526 B2* | 3/2019 | Xuan | G06F 21/54 |
| 2004/0006637 A1 | 1/2004 | Kuacharoen et al. | |
| 2008/0155006 A1* | 6/2008 | Franklin | H04L 67/34 |
| | | | 709/200 |
| 2014/0358983 A1* | 12/2014 | Dalmau | H04L 67/10 |
| | | | 709/201 |
| 2015/0067763 A1* | 3/2015 | Dalcher | G06F 21/554 |
| | | | 726/1 |
| 2015/0331698 A1* | 11/2015 | Dietze | G06F 8/65 |
| | | | 713/2 |
| 2016/0077819 A1* | 3/2016 | Xin | G06F 9/45504 |
| | | | 717/174 |
| 2017/0139696 A1* | 5/2017 | Yehuda | G06F 8/61 |

FOREIGN PATENT DOCUMENTS

| | | | |
|---|---|---|---|
| CN | 102117245 A | 7/2011 | |
| CN | 102662703 A | 9/2012 | |
| CN | 103795761 A | 5/2014 | |
| CN | 106547578 A | 3/2017 | |

OTHER PUBLICATIONS

Office Action for Chinese Application No. 201710515088.4 dated Jan. 15, 2020, 10 pages.

* cited by examiner

METHOD, DEVICE AND USER TERMINAL FOR LOADING APPLICATION

CROSS-REFERENCE TO RELATED APPLICATION

The present invention claims priority to and benefit of Chinese Patent Application No. 201710515088.4, filed with the State Intellectual Property Office (SIPO) of the People's Republic of China on Jun. 29, 2017, the entire content of which is incorporated by reference into the present application.

TECHNICAL FIELD

The present invention relates to the field of Internet technology; and more specifically, it relates to a method, a device and a user terminal for loading an application.

BACKGROUND ART

An application is software product prepared for meeting the application purpose of users. As a major player in the Internet to provide users with a service, the operation of an application directly affects the user experience when users are using Internet services. As applications are able to provide more and more different functions, the services provided thereby become more and more intelligent, while the code corresponding to each application is also getting more and more complex, which in turn causes the application loading process to be very slow, prone to errors, as well as occupy a large amount of storage space for a long period of time.

SUMMARY OF INVENTION

One object of the present invention is to provide a method for loading an application to solve or improve the foregoing problem.

Another object of the present invention is to provide a device for loading an application to solve or improve the foregoing problem.

Another object of the present invention is to provide a user terminal.

In order to achieve the foregoing objects, the embodiments of the present invention employ the following technical solutions:

One or more embodiments of the present invention provide a method for loading an application, the method is applied in a user terminal, and the method includes: in response to a function enabling instruction, matching an independent functional component of a corresponding application, wherein the application is packaged in advance according to the implemented functions thereof to include multiple functional components, and the functional components comprise an independent functional component; obtaining an executable file corresponding to the independent functional component; loading the executable file corresponding to the independent functional component.

One or more embodiments of the present invention provide a device for loading an application, the device is applied in a user terminal, and the device includes: a matching module, which is configured for, in response to a function enabling instruction, matching an independent functional component of a corresponding application, wherein the application is packaged in advance according to the implemented functions thereof to include multiple functional components, and the functional components comprise an independent functional component; an obtaining module, which is configured for obtaining an executable file corresponding to the independent functional component; and a first loading module, which is configured for loading the executable file corresponding to the independent functional component.

One or more embodiments of the present invention provide a user terminal, and the user terminal includes: a memory; a processor; and a device for loading an application, wherein the device for loading an application is installed in the memory, and includes one or more software functional modules executed by the processor, the device for loading an application includes: a matching module, which is configured for, in response to a function enabling instruction, matching an independent functional component of a corresponding application, wherein the application is packaged in advance according to the implemented functions thereof to include multiple functional components, and the functional components comprise an independent functional component; an obtaining module, which is configured for obtaining an executable file corresponding to the independent functional component; and a first loading module, which is configured for loading the executable file corresponding to the independent functional component.

Compared with the prior art, the present invention provides a new method, device and user terminal for loading an application, in which the method for loading an application is applied to a user terminal, and the method includes: in response to a function enabling instruction, matching independent functional components of a corresponding application program, where the application program is packaged in advance according to the implemented functions to include multiple functional components, and the functional components include an independent functional component; obtaining an executable file corresponding to the independent functional component; and loading the executable file corresponding to the independent functional component. According to the present invention, a corresponding executable file is loaded according to a started function, such that the application is loaded in a way more flexible and quicker. The present invention is able to avoid the problem that application will occupy a lot of storage space as soon as it is started, thereby improving the user experience.

The above objects, features and advantages of the present invention will become more apparent from the following detailed description of certain preferred embodiments of the present invention, which is made in reference with the accompanying drawings.

BRIEF DESCRIPTION OF DRAWINGS

To describe the technical solutions in the embodiments of the present invention more clearly, the following description briefly describes the accompanying drawings required for describing the embodiments of the present invention. It is to be understood that the following drawings merely illustrate some embodiments of the present invention and therefore, do not limit the scope of the present invention. For a person of ordinary skill in the art, other related drawings may also be obtained based on the provided drawings without any creative work.

Element numerals: 100—user terminal, 111—memory, 112—storage controller, 113—processor, 114—peripheral interface, 115—display unit, 116—input/output unit, 200—a device for loading an application, 201—obtaining module, 202—matching module, 2021—querying sub-module, 2022—obtaining sub-module, 2023—determining sub-module, 203—first loading module, 204—acquiring module, 205—second loading module

DESCRIPTION OF EMBODIMENTS

The technical solutions of the embodiments of the present invention are clearly and completely described below with reference to the accompanying drawings of the embodiments of the present invention. Apparently, the described embodiments are merely a few rather than all of the embodiments of the present invention. The components of the embodiments of the present invention, which are described and illustrated in the figures herein, may be arranged and designed in a wide variety of different configurations. Accordingly, the following detailed description of the embodiments of the present invention shown in the accompanying drawings is not intended to limit the scope of the present invention, rather merely to illustrate selected embodiments of the invention. All other embodiments obtained by a person skilled in the art based on the embodiments of the present invention without creative efforts shall fall within the protection scope of the present invention.

It should be noted that similar reference numbers and letters designate similar terms in the following figures, and therefore, once an element is defined in a drawing, the same element will not be defined or explained again in any subsequent drawings. In the meantime, in the description of the present invention, the terms "first", "second", and the like are only used to distinguish a description, and cannot be understood as indicating or implying relative importance.

Figure 1:
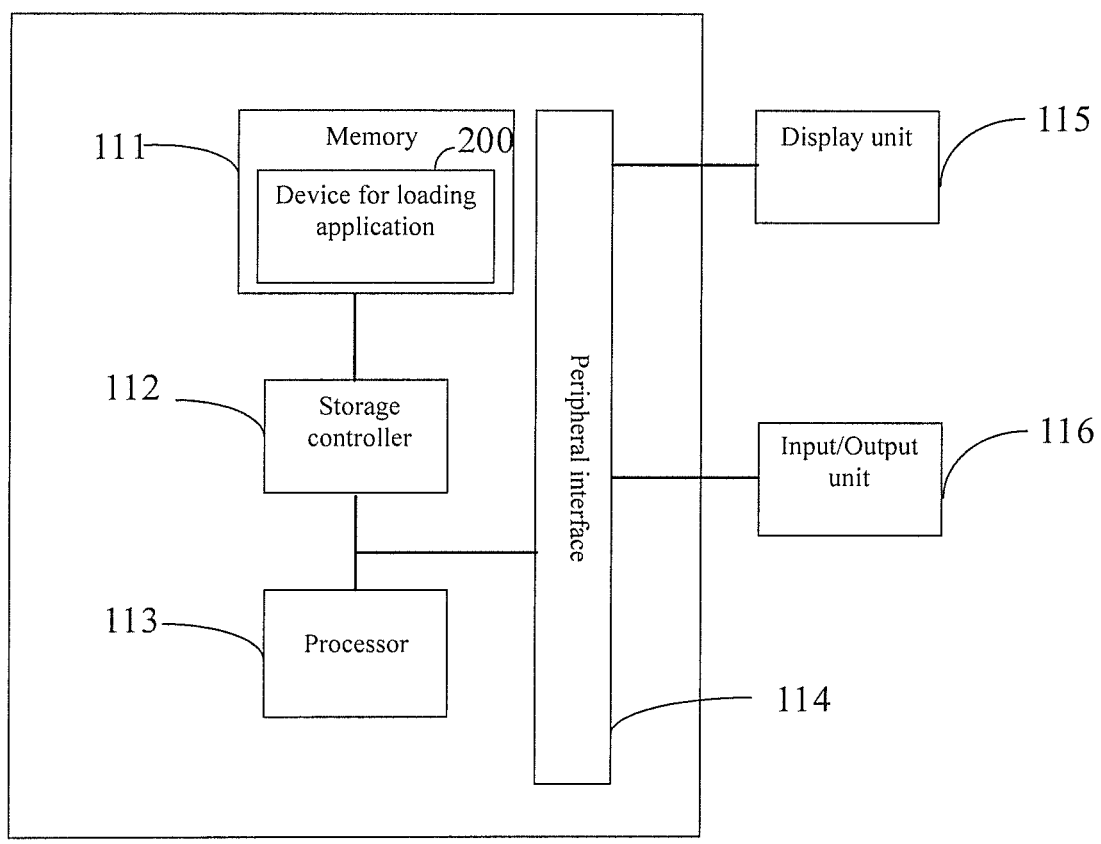
FIG. 1 is a schematic block diagram showing a user terminal provided in one or more preferred embodiments of the present invention.

FIG. 1 is a schematic block diagram showing a user terminal 100 provided in one or more preferred embodiments of the present invention. The user terminal 100 can be, but is not limited to, a mobile terminal device, and the computer may include, for example, a smart phone, a tablet computer, a laptop computer, a car computer, a personal digital assistant (PDA), a desktop computer, and the like. The user terminal 100 includes a device for loading an application 200, a memory 111, a storage controller 112, a processor 113, a peripheral interface 114, a display unit 115, and an input/output unit 116.

The memory 111, the memory controller 112, the processor 113, the peripheral interface 114, the input, the display unit 115, and the input/output unit 116 are directly or indirectly electrically connected to each other for data transmission or interaction. For example, the elements may be electrically connected to each other by one or more communication buses or signal lines. The device for loading an application 200 includes at least one software functional module that can be stored in the memory 111 in the form of software or firmware or hardened in an operating system (OS) of the user terminal 100. The processor 113 is configured to execute an executable module stored in the memory 111, for example, a software functional module and a computer program included in the device for loading an application 200.

The memory 111 can be, but is not limited to, a random access memory (RAM), a read only memory (ROM), a programmable read-only memory (PROM), an erasable programmable read-only memory (EPROM), an electric erasable programmable read-only memory (EEPROM), and the like. The memory 111 is used to store a program (including an operating system program), and the processor 113 executes the program after receiving an execution instruction. Access to the memory 111 by the processor 113 and other possible components may be under the control of the memory controller 112.

The processor 113 can be an integrated circuit chip with signal processing capability. The processor 113 may be a general purpose processor, including a central processing unit (CPU), a network processor (NP), and the like. The processor 113 may also be a digital signal processor (DSP), an application specific integrated circuit (ASIC), a field programmable gate array (FPGA) or other programmable logic devices, discrete gates or transistor logic parts, discrete hardware components, which are able to implemented or executed the respective methods, steps, and logic blocks disclosed in the embodiments of the present invention. A general purpose processor may be a microprocessor, or the processor 113 can also be any conventional processor or the like.

The peripheral interface 114 couples various input/output devices (such as the display unit 115 and the input/output unit 116) to the processor 113 and the memory 111. In some embodiments of the present invention, the peripheral interface 114, the processor 113, and the memory controller 112 may be achieved a single chip. In other cases, they can be achieved by separate chips.

The display unit 115 provides an interactive interface (such as a user interface) between the user terminal 100 and the user, or for displaying image and data. In this embodiment of the present invention, the display unit 115 may be a liquid crystal display or a touch display. If it is a touch display, it can be a capacitive touch screen or a resistive touch screen, which support both single-point and multi-touch operations. The term of supporting single-point and multi-touch operations refers to that the touch display can sense touch operations generated at one or more locations on the touch screen, and the sensed touch operations are then sent to the processor 113 for further calculation and processing.

The input/output unit 116 is configured for allowing a user to input data or achieve an interaction between the user and the user terminal 100. The input/output unit 116 can be, but is not limited to, a virtual keyboard, a voice input circuit, and the like.

First Embodiment

Figure 2:
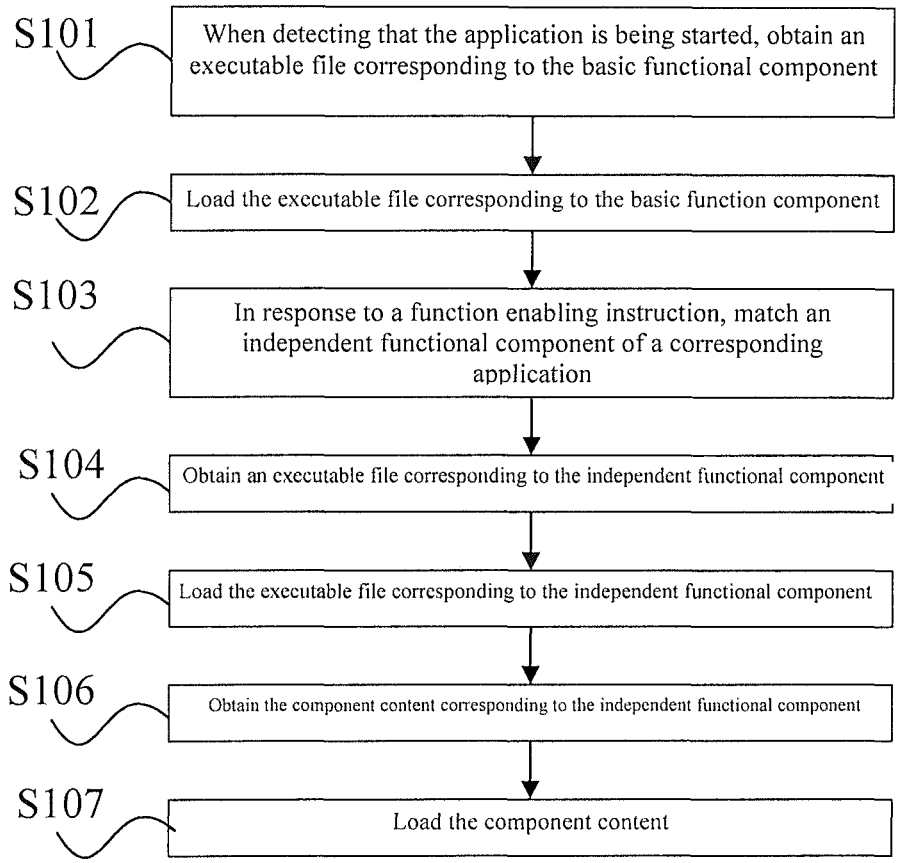
FIG. 2 is a flow chart of a method for loading an application provided in one or more embodiments of the present invention.

FIG. 2 is a flow chart of a method for loading an application provided in one or more embodiments of the present invention. In reference to FIG. 2, the method for loading an application is applied to the user terminal 100. The method comprises the following steps:

Step S101, when detecting that the application is being started, obtain an executable file corresponding to the basic functional component.

In this embodiment, the application program is packaged into a number of different functional components in advance according to their respective different functions, and stored in the memory 111 of the user terminal 100. Alternatively, the functional components of the application may be stored in the asset directory. The functional components include a basic functional component. It should be noted that a basic functional component is a functional component for implementing a basic function of the application, that is, the basic functional component must be loaded when the application is started, for example, a functional component for displaying the initial interface. Moreover, an executable file is a file that can be loaded and executed by an operating system, for example, the executable file corresponding to an android operating system is a DEX file. The executable file corresponding to a basic functional component can be obtained by decompressing the corresponding functional component in an application. Optionally, the basic functional component of the application is decompressed by the user terminal 100 and then stored in the user terminal 100, so as to be directly obtained next time when the application is started in the future without decompressing the basic functional component again. For example, the basic work component under the asset directory can be decompressed to the application directory, and can be directly obtained from the decompressed basic functional component in the application directory when it needs to obtain the executable files corresponding to the basic file.

Step S102, load the executable file corresponding to the basic functional component into the memory 111 of the user terminal 100.

In this embodiment, the obtained executable file corresponding to the basic functional component is loaded into the temporary storage in the memory 111. In addition, the component content corresponding to the basic functional component is also loaded into the temporary storage to perform the basic function corresponding to the basic functional component, so as to achieve the operation of the application.

Step S103, in response to a function enabling instruction, match an independent functional component of a corresponding application.

Figure 3:
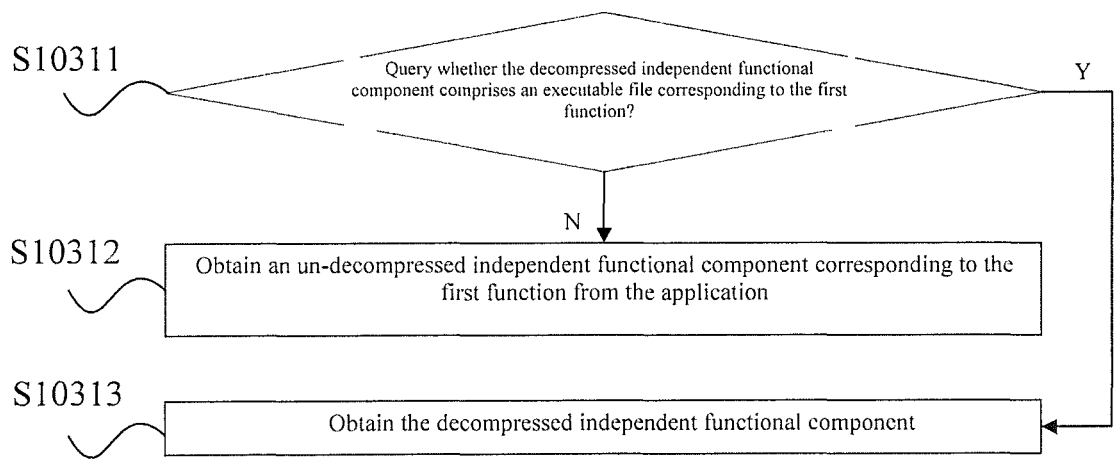
FIG. 3 is a flow chart of a sub-step of Step 103 in one embodiment of the present invention.

In this embodiment, the application is packaged in advance according to the implemented functions to include a number of different functional components, and the functional components also include a plurality of independent functional components. After running the application, the independent function component may be loaded and executed to implement the respective functions corresponding to the independent function components. Independent functional components are loaded when their corresponding function enable instructions are triggered, so as to reduce unnecessary storage space occupied. Using a Taobao client as an example, a Taobao client may include the function of searching a product, the function of communication with a seller, the function of making a payment, and so on. In the case when a Taobao client needs to perform any one of the foregoing functions, the independent functional component corresponding to that specific function needs to be loaded and executed. For example, in order to achieve the function of searching for a product, a search functional component needs to be loaded and executed accordingly; in order to achieve the function of communicating with a seller, a chat functional component needs to be loaded and executed accordingly; and in order to achieve the function of making a payment, a payment functional component needs to be loaded and executed accordingly. Moreover, in order to use any one of the independent functional components, the independent functional component needs to be matched first. For example, in the case that a user's requirement of using is to realize the function of searching for a product, a search for a start instruction is triggered by clicking the search box via the input-output unit 116. The user terminal 100 triggers according to the obtained search start instruction to match the search function component. The action of matching an independent functional component needs its corresponding function enabling instruction to be triggered. Optionally, a user can trigger a function enabling instruction through the input/output unit 116 according to a requirement of use. For example, in the case when a user needs to search for a product, the search enabling instruction is initiated by clicking a search box through the input/output unit 116, and then the user terminal 100, according to the search enabling instruction, triggers and matches the corresponding search functional component. In the case when a user needs to communicate with a seller, the communication enabling instruction from the user is received through the input/output unit 116, and then the user terminal 100, according to the communication enabling instruction, matches the corresponding chat functional component. Moreover, in the case when a user needs to make a payment, the payment enabling instruction from the user is triggered by receiving user's finger print or password through the input/output unit 116, and then the user terminal 100, according to the payment enabling instruction, matches the corresponding payment functional component. After obtaining the function enable instruction, the user terminal 100 matches the corresponding independent functional component with a first function that needs to be implemented according to the obtained function enabling instruction. Please refer to FIG. 3, step S103, which includes the following sub-steps:

Sub-step S10311, query whether the decompressed independent functional component comprises an executable file corresponding to the first function.

In this embodiment, the independent functional component includes the corresponding executable file. The corresponding executable file is obtained by way of decompressing the independent functional component. Loading and executing the independent functional components includes loading and executing the corresponding executable file. When an independent functional component in an application is used for the first time, the corresponding independent functional component needs to be obtained from the application and decompressed to obtain the corresponding executable file and then store the corresponding executable file. In this way, when the user terminal 100 obtains a function enabling instruction corresponding to the first function, it first queries the independent functional component that has been decompressed to check whether there is an executable file corresponding to the first function, so as to reduce repeating work that takes up extra storage space. When there is no executable file corresponding to the first function, the procedure goes to sub-step S10312; while when there is an executable file corresponding to the first function, the procedure goes to sub-step S10313.

Sub-step S10312, obtain an un-decompressed independent functional component corresponding to the first function from the application.

In this embodiment, the program file of the application is accessed from the memory 111 according to the directory path in which the application is stored. The program file includes all of the independent functional components and basic functional components, and none of them has been decompressed. Hence, the independent functional component corresponding to execute the first function is obtained from the un-decompressed independent functional components.

Sub-step S10313, obtain the decompressed independent functional component.

Figure 4:
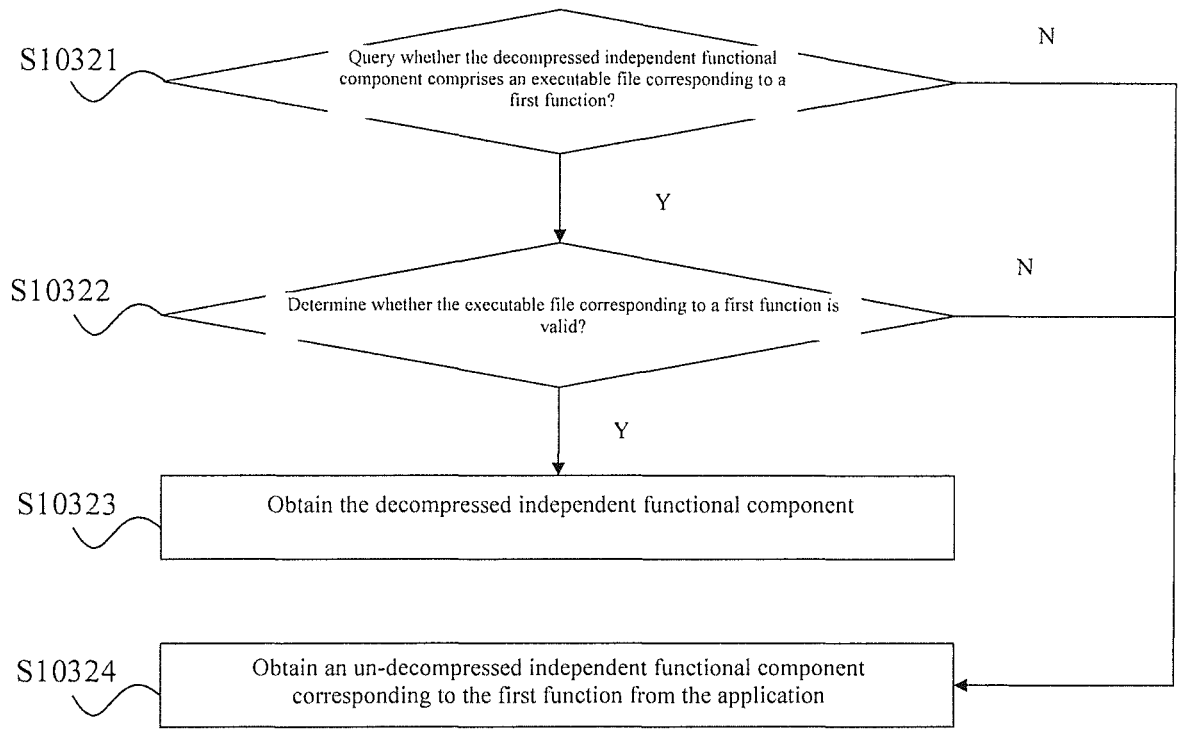
FIG. 4 is a flow chart of a sub-step of Step 103 in another embodiment of the present invention.

In other embodiments, as shown in FIG. 4, step S103 may further include the following sub-steps:

Sub-step S10321, query whether the decompressed independent functional component comprises an executable file corresponding to a first function, if there is an executable file corresponding to the first function, the procedure goes to sub-step S10322; while when there is no executable file corresponding to the first function, the procedure goes to sub-step S10324.

Sub-step S10322, determine whether the executable file corresponding to a first function is valid. Optionally, the first MD5 code of the executable file corresponding to the first function is calculated using an information digest algorithm, and then the first MD5 code is compared with the second MD5 code of the executable file which is calculated and saved when decompressing the independent functional component corresponding to the first function, so as to check whether the decompressed stand-alone functional component has been tampered with during storage, thereby avoiding running a tampered programs to reduce the user's experience. When the executable file corresponding to the first function is valid, the procedure goes to sub-step S10323, while when the executable file corresponding to the first function is invalid, the procedure goes to sub-step S10324.

Sub-step S10323, obtain the decompressed independent functional component.

Sub-step S10324, obtain an un-decompressed independent functional component corresponding to the first function from the application.

Step S104, obtain an executable file corresponding to the independent functional component.

In this embodiment, the executable file is obtained from the independent functional component obtained in step S103. The user terminal 100 cannot directly obtain the corresponding executable file from the un-decompressed independent functional component, but can obtain it from the decompressed independent functional component. Optionally, when the independent function component obtained in step S103 is not decompressed, the un-decompressed independent function component corresponding to the first function is decompressed to obtain the executable file. When the independent function component obtained in step S103 is decompressed, an executable file corresponding to the first function is obtained from the decompressed independent functional component. It should be noted that the executable file is a file that can be loaded and executed by an operating system. For example, the executable file corresponding to the Android operating system is the DEX file.

Step S105, load the executable file corresponding to the independent functional component.

In this embodiment, the user terminal 100 can execute the first function corresponding to the independent function component only after the executable file has been loaded. Optionally, the executable file can be loaded into a temporary storage for an immediate execution. Specifically, the execution file corresponding to the independent function component is incorporated into an executable file corresponding to the basic function component. The executable file corresponding to the basic functional component is loaded into the temporary memory for execution at the time when the application is started. Thus, when the executable file corresponding to the independent functional component is incorporated into the executable file corresponding to the basic functional component, the loading of the executable file corresponding to the independent functional component can be achieved.

Step S106, obtain the component content corresponding to the independent functional component.

In this embodiment, the corresponding executable file and component content can be obtained after the independent functional component is decompressed. Each time when an independent functional component is decompressed, the obtained executable file and component content will replace the executable file and component content obtained from last decompression. After the executable file is loaded, the corresponding component content can be obtained directly from the corresponding decompressed independent functional component. The component content is the material data required by the executable file to perform the first function. For example, when the executable file in the Taobao client performs the function of chatting with a seller, the content of the component may be, but is not limited to, the dialog box image material, the interface display material, and so on.

Step S107, load the component content.

In this embodiment, the component content is loaded into a temporary storage so that the component content can be easily called when the executable file is executed, so as to show the related functions and interface to a user through the display unit 115.

Second Embodiment

Figure 5:
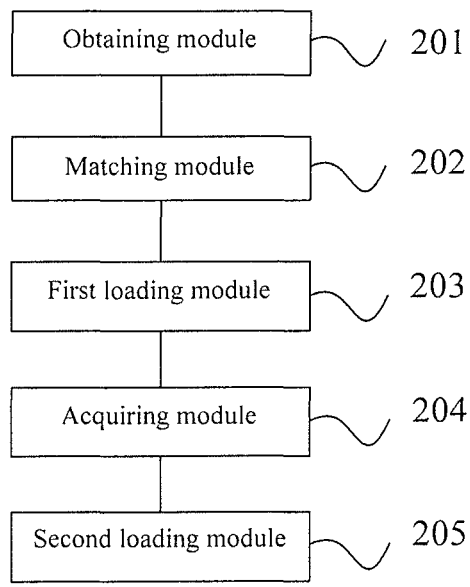
FIG. 5 is a schematic view of the functional modules in a device for loading an application provided in one or more preferred embodiments of the present invention.

In reference to FIG. 5, FIG. 5 is a schematic view of the functional modules in a device for loading an application 200 provided in one or more preferred embodiments of the present invention. The device for loading an application 200 includes an obtaining module 201, a matching module 202, a first loading module 203, an acquiring module 204, and a second loading module 205.

The obtaining module 201 is configured for, when detecting that the application is being started, obtaining an executable file corresponding to the basic functional component.

In this embodiment, step S101 can be performed by the obtaining module 201.

The first loading module 203 is further configured for loading the executable file corresponding to the basic function component into a memory 111 of the user terminal 100.

In this embodiment, step S102 can be performed by the obtaining module 203.

The matching module 202 is configured for, in response to a function enabling instruction, matching an independent functional component of a corresponding application.

Figure 6:
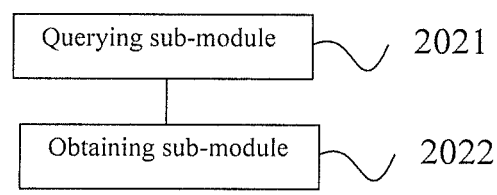
FIG. 6 is a schematic view of the functional sub-modules in the matching module in one embodiment of the present invention.

In this embodiment, the application is packaged in advance according to different implemented functions to include a number of different functional components, where the functional components include multiple independent functional components. Step S103 can be performed by the matching module 202. When the application is running, it can achieve multiple independent functions, and each independent function corresponds to an independent functional component. An independent function component is loaded and executed only when its corresponding function is to be used. To reduce unnecessary storage space occupation, optionally, when the user needs to enable an independent function in the application, a function enabling instruction corresponding to the independent function is generated through the input/output unit 116. For example, when a user needs to use the Taobao client to search for a product, the user can click the search box to trigger the search function enabling instruction. After obtaining the function enable instruction, the user terminal 100 matches the corresponding independent functional component with the first function that needs to be implemented according to the obtained function enabling instruction. In reference to FIG. 6, the matching module 202 includes the following sub-modules:

A querying sub-module 2021 is configured for querying whether the decompressed independent functional component comprises an executable file corresponding to a first function.

In this embodiment, sub-step S10311 can be performed by the querying sub-module 2021.

In other embodiment, sub-step S10321 can be performed by the querying sub-module 2021.

An obtaining sub-module 2022 is configured for obtaining an un-decompressed independent functional component corresponding to the first function from the application, and further configured for obtaining the decompressed independent functional component.

In this embodiment, both sub-step S10312 and sub-step S10313 may be performed by the obtaining sub-module 2022. Optionally, if there is no executable file corresponding to the first function, sub-step S10312 is executed; while if there is an executable file corresponding to the first function, sub-step S10313 is executed.

In other embodiments, both sub-step S10323 and sub-step S10324 may be performed by obtaining sub-module 2022. Optionally, if an executable file corresponding to the first function exists and the executable file corresponding to the first function is valid, the obtaining sub-module 2022 executes sub-step S10323; while when there is no executable file corresponding to the first function, or the executable file corresponding to the first function is invalid, the obtaining sub-module 2022 executes sub-step S10324.

Figure 7:
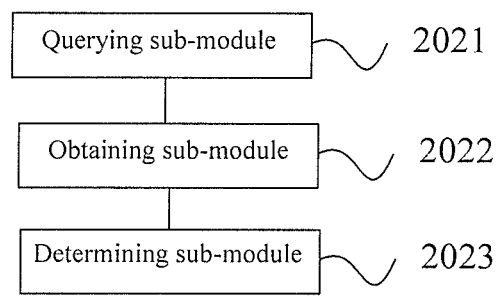
FIG. 7 is a schematic view of the functional sub-modules in the matching module in another embodiment of the present invention.

In other embodiments, as shown in FIG. 7, the matching module 202 may further includes: a determining sub-module 2023 that is configured for determining whether the executable file corresponding to a first function is valid. Sub-step S10322 can be performed by the determining sub-module 2023.

The obtaining module 201 is further configured for obtaining the executable file corresponding to the independent function component.

In this embodiment, step S104 may be performed by the obtaining module 201. Optionally, the manner in which the obtaining module executes obtaining an executable file corresponding to the independent functional component comprises any one of the following procedure: decompressing the un-decompressed independent functional component corresponding to the first function to obtain the executable file; or obtaining the executable file corresponding to the first function from the decompressed independent functional component.

A first loading module 203 is further configured for loading the executable file corresponding to the independent functional component.

In this embodiment, step S105 may be executed by the first loading module 203. Optionally, the manner in which the first loading module executes loading the executable file corresponding to the independent functional component comprises incorporating the executable file corresponding to the independent functional component into the executable file corresponding to the basic functional component.

An acquiring module 204 is configured for obtaining component content corresponding to the independent functional component.

In this embodiment, step S106 can be performed by the acquiring module 204.

A second loading module 205 is configured for loading the component content.

In this embodiment, step S107 can be performed by second loading module 205.

In summary, the present invention provides a method, a device and a user terminal for loading an application, in which the method for loading an application is applied to a user terminal, and the method includes: in response to a function enabling instruction, matching independent functional components of a corresponding application program, where the application program is packaged in advance according to the implemented functions to include multiple functional components, and the functional components include an independent functional component; obtaining an executable file corresponding to the independent functional component; and loading the executable file corresponding to the independent functional component. Only the executable file corresponding to a function to be used is loaded, such that the application is loaded in a way more flexible and quicker. The present invention is able to avoid the problem that an application may occupy a lot of storage space for a long period of time, thereby improving the operating efficiency of the application and improving the user experience as well.

As for the several embodiments provided in the present application, it should be understood that the disclosed device and method may also be implemented in other manners. The device embodiments described above are merely exemplary. For example, the flow charts and block diagrams in the drawings show the system architecture, functions and operation of the device, method and computer program products according to the embodiments of the present invention. In this regard, each block in the flow charts or block diagrams may represent a module, a section of a program, or a portion of a code, where the module, section of a program, or portion of a code includes the executable instructions for implementing a specified logic function. It should also be noted that in some alternative implementations, the functions noted in the blocks may occur out of the order indicated in the figures. For example, two consecutive blocks may in fact be executed substantially in parallel, and sometimes they may be executed in a reverse order, depending on the specific function involved. It is also to be noted that each block of the block diagrams and/or flow chart and combinations of blocks in a block diagrams and/or flow chart can be implemented by special purpose hardware-based systems that perform a specified function or action, or may be implemented using a combination of dedicated hardware and computer instructions.

In addition, the functional modules in the embodiments of the present invention may be integrated together to form a single part, or each of the modules may exist separately, or two or more modules may be integrated to form an independent part.

When the function is implemented in the form of a software functional module and is sold or used as an independent product, the function may be stored in a computer-readable storage medium. Based on this understanding, the technical solution of the present invention essentially, or the part contributing to the prior art, or the part of the technical solution may be embodied in the form of a software product stored in a storage medium, including a number of instructions that are used to enable a computer device (which may be a personal computer, a server, a network device, or the like) to execute all or part of the steps of the method according to one or more embodiments of the present invention. The foregoing storage medium includes various media capable of storing program code such as a USB flash memory, a removable hard disk, a read-only memory (ROM), a random access memory (RAM), a magnetic disk, or an optical disk.

It should be noted that, in this application, relational terms such as first and second are merely used to distinguish one entity or operation from another entity or operation, and do not necessarily require or imply that the entities or operations actually have any such relationship or order therebetween. In addition, the terms "comprise", "include" or any other variations thereof are intended to cover a non-exclusive inclusion such that a process, method, article, or device that includes a list of elements includes not only those elements but also those that are not explicitly listed or other elements that are inherent to such process, method, article, or device. Without further limitations, an element limited by the statement "including a . . . " does not exclude the existence of additional identical elements in the process, method, article, or device that includes the element.

The foregoing descriptions are merely a few preferred embodiments of the present invention and are not intended to limit the present invention. For those skilled in the art, the present invention may have various modifications and changes. Any modification, equivalent replacement, improvement, and the like within the spirit and principle of the present invention should be encompassed within the protection scope of the present invention. It should be noted that similar reference numbers and letters designate similar terms in the figures of the present application, and therefore, an element will not be defined or explained in any subsequent drawings once the element is defined in a drawing.

The foregoing descriptions are merely a few specific embodiments of the present invention, but the protection scope of the present invention is not limited thereto. A person skilled in the art may easily conceive of changes and substitutions within the technical scope disclosed in the present invention, which should be encompassed within the protection scope of the present invention. Therefore, the protection scope of the present invention should be defined by the claims of the present application.

What is claimed is:

1. A method for loading an application, wherein the method is applied in a user terminal, and the method comprises:
in response to receiving a function enabling instruction corresponding to a function of the application, matching an independent functional component of the application corresponding to the function of the application, wherein the application is packaged in advance according to implemented functions to include multiple functional components, and the multiple functional components comprise the independent functional component;
obtaining an executable file corresponding to the independent functional component; and
loading the executable file corresponding to the independent functional component,
wherein the step of responding to the function enabling instruction, matching the independent functional component of the application comprises:
querying whether a decompressed independent functional component comprises an executable file corresponding to a first function;
determining whether the executable file corresponding to the first function is valid;
if there is no executable file corresponding to the first function or the executable file corresponding to the first function is not valid, obtaining an un-decompressed independent functional component corresponding to the first function from the application; and
if there is the executable file corresponding to the first function and the executable file corresponding to the first function is valid, obtaining the decompressed independent functional component.

2. The method for loading an application according to claim 1, wherein
the multiple functional components further comprise a basic functional component, and the method further comprises:
when detecting that the application is being started, obtaining an executable file corresponding to the basic functional component; and
loading the executable file corresponding to the basic functional component into a memory of the user terminal.

3. The method for loading an application according to claim 2, wherein the step of loading the executable file corresponding to the independent functional component comprises:
incorporating the executable file corresponding to the independent functional component into the executable file corresponding to the basic functional component.

4. The method for loading an application according to claim 1, wherein the step of responding to the function enabling instruction, matching the independent functional component of the application comprises:
querying whether a decompressed independent functional component comprises an executable file corresponding to a first function;
if there is no executable file corresponding to the first function, obtaining an un-decompressed independent functional component corresponding to the first function from the application; and
if there is the executable file corresponding to the first function, obtaining the decompressed independent functional component.

5. The method for loading an application according to claim 4, wherein the step of obtaining the executable file corresponding to the independent functional component comprises:
decompressing the un-decompressed independent functional component corresponding to the first function to obtain the executable file; or obtaining the executable file corresponding to the first function from the decompressed independent functional component.

6. The method for loading an application according to claim 1, wherein after the step of loading the executable file corresponding to the independent functional component, the method further comprises:
obtaining component content corresponding to the independent functional component; and
loading the component content.

7. The method of claim 1, wherein, prior to matching the independent functional component of the application, the method further comprises:
   starting the application; and
   subsequent to starting the application, receiving the function enabling instruction.

8. The method of claim 1, wherein the multiple functional components comprise at least one basic functional component and at least one independent functional component, wherein the at least one basic functional component is triggered by starting the application, wherein the at least one independent functional component is triggered by receiving a corresponding function enabling instruction.

9. A user terminal, wherein the user terminal comprises;
   a memory;
   a processor; and
   a device for loading an application, wherein the device for loading the application is installed in the memory, and comprises one or more software functional modules executed by the processor, the device for loading the application comprises:
      a matching module, executed by the processor, in response to receiving a function enabling instruction corresponding to a function of the application, matching an independent functional component of the application corresponding to the function of the application, wherein the application is packaged in advance according to implemented functions to include multiple functional components, and the multiple functional components comprise the independent functional component;
      an obtaining module, executed by the processor, for obtaining an executable file corresponding to the independent functional component; and
      a first loading module, executed by the processor, for loading the executable file corresponding to the independent functional component,
   wherein the responding to the function enabling instruction, matching the independent functional component of the application comprises:
   querying whether a decompressed independent functional component comprises an executable file corresponding to a first function;
   determining whether the executable file corresponding to the first function is valid;
   if there is no executable file corresponding to the first function or the executable file corresponding to the first function is not valid, obtaining an un-decompressed independent functional component corresponding to the first function from the application; and
   if there is the executable file corresponding to the first function and the executable file corresponding to the first function is valid, obtaining the decompressed independent functional component.

10. The method for loading an application according to claim 1, wherein the step of obtaining the executable file corresponding to the independent functional component comprises:
   decompressing the un-decompressed independent functional component corresponding to the first function to obtain the executable file; or obtaining the executable file corresponding to the first function from the decompressed independent functional component.

* * * * *